S. M. HOUCK.
HARVESTER.
APPLICATION FILED JULY 25, 1907. RENEWED AUG. 17, 1909.
953,145.
Patented Mar. 29, 1910.
6 SHEETS—SHEET 5.
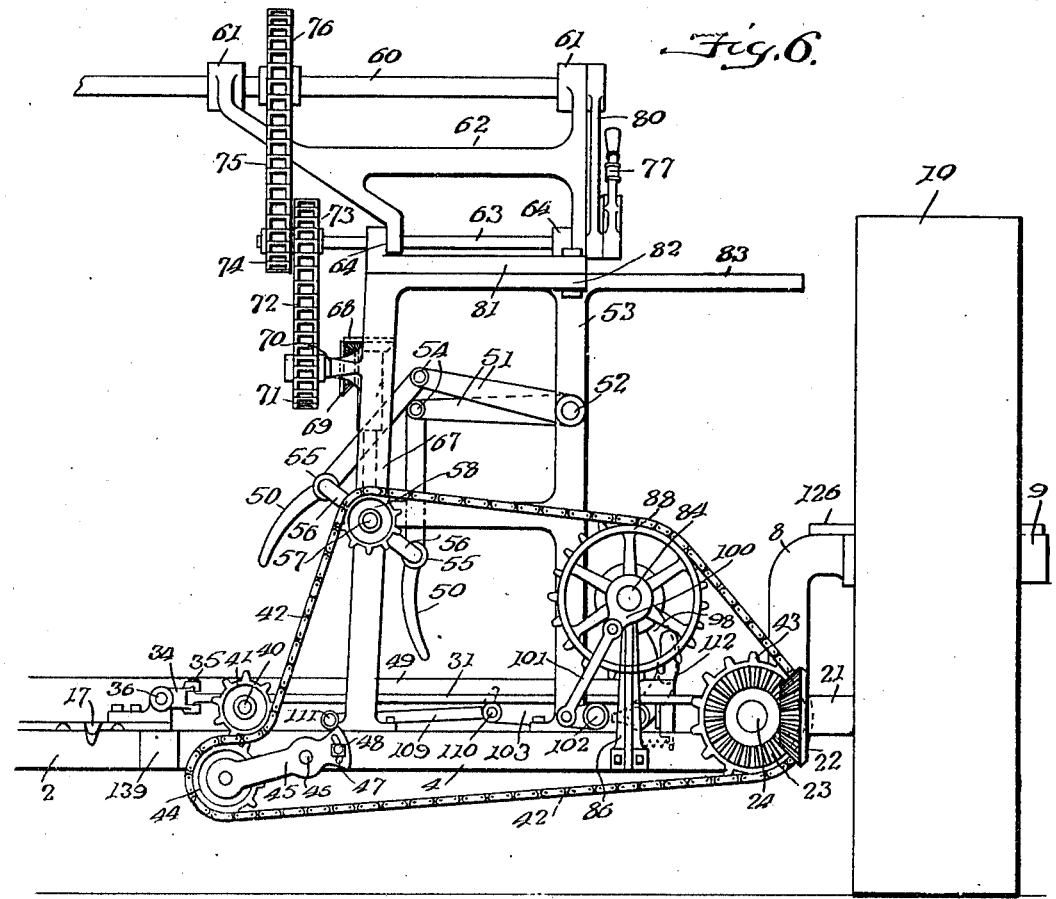
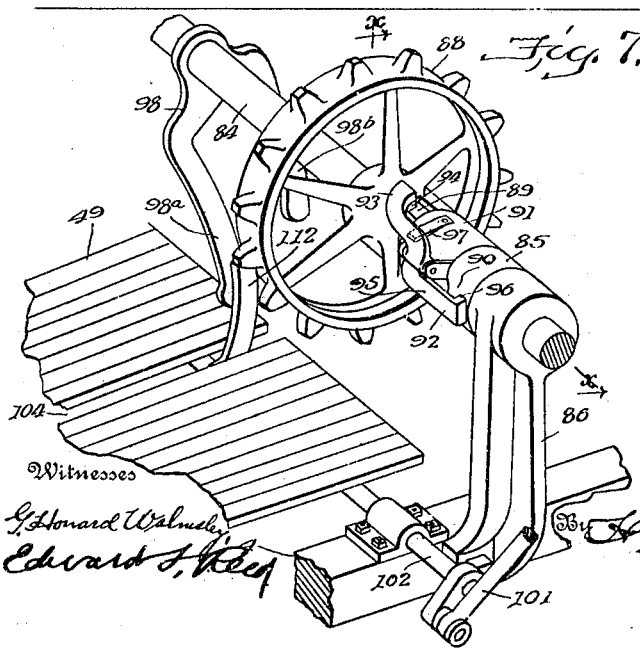
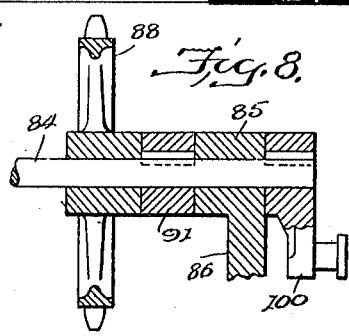
Witnesses
Inventor
Samuel M. Houck,
Attorney S. M. HOUCK.
HARVESTER.
APPLICATION FILED JULY 25, 1907. RENEWED AUG. 17, 1909.
953,145.
Patented Mar. 29, 1910.
6 SHEETS—SHEET 6.
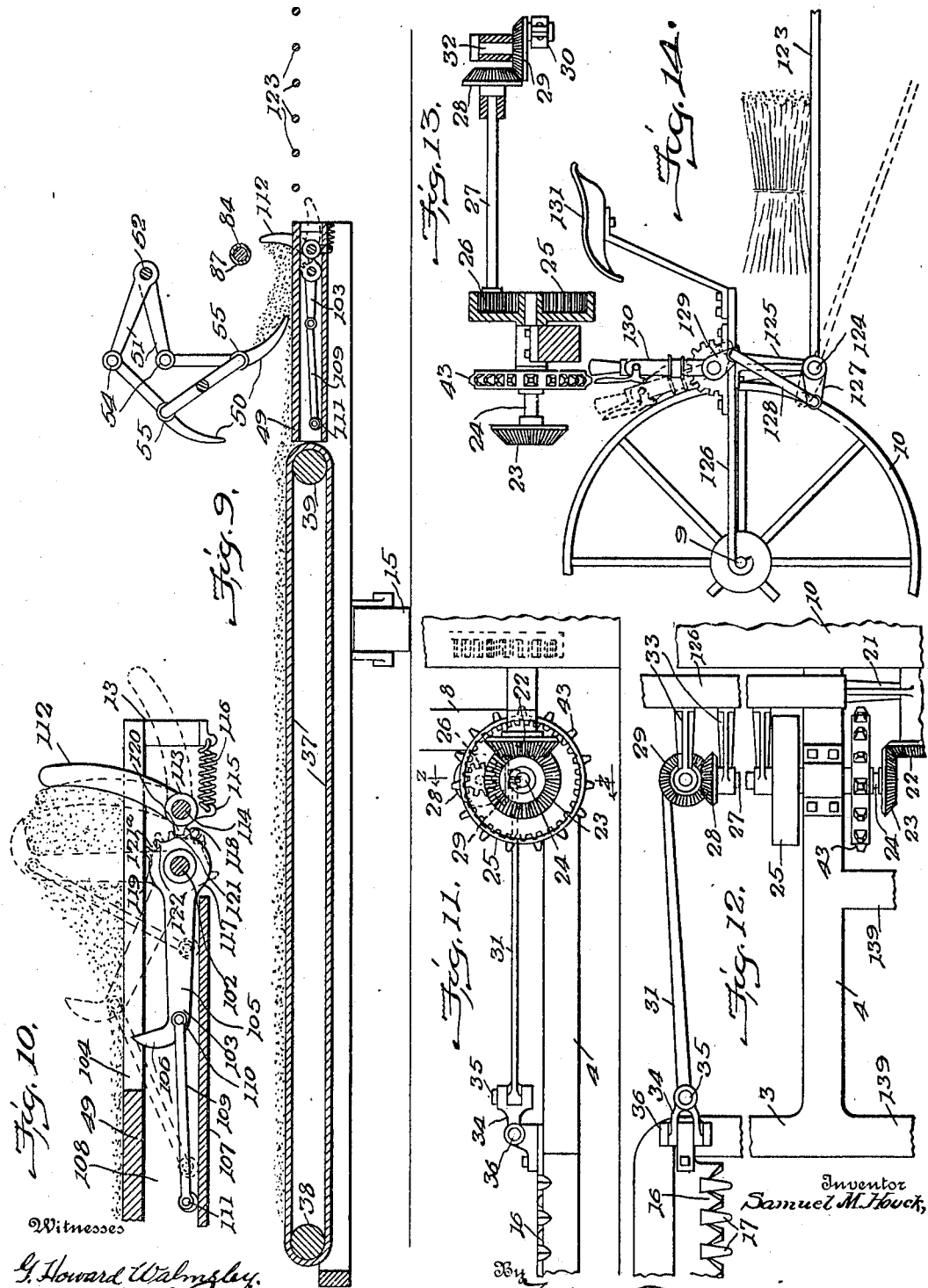

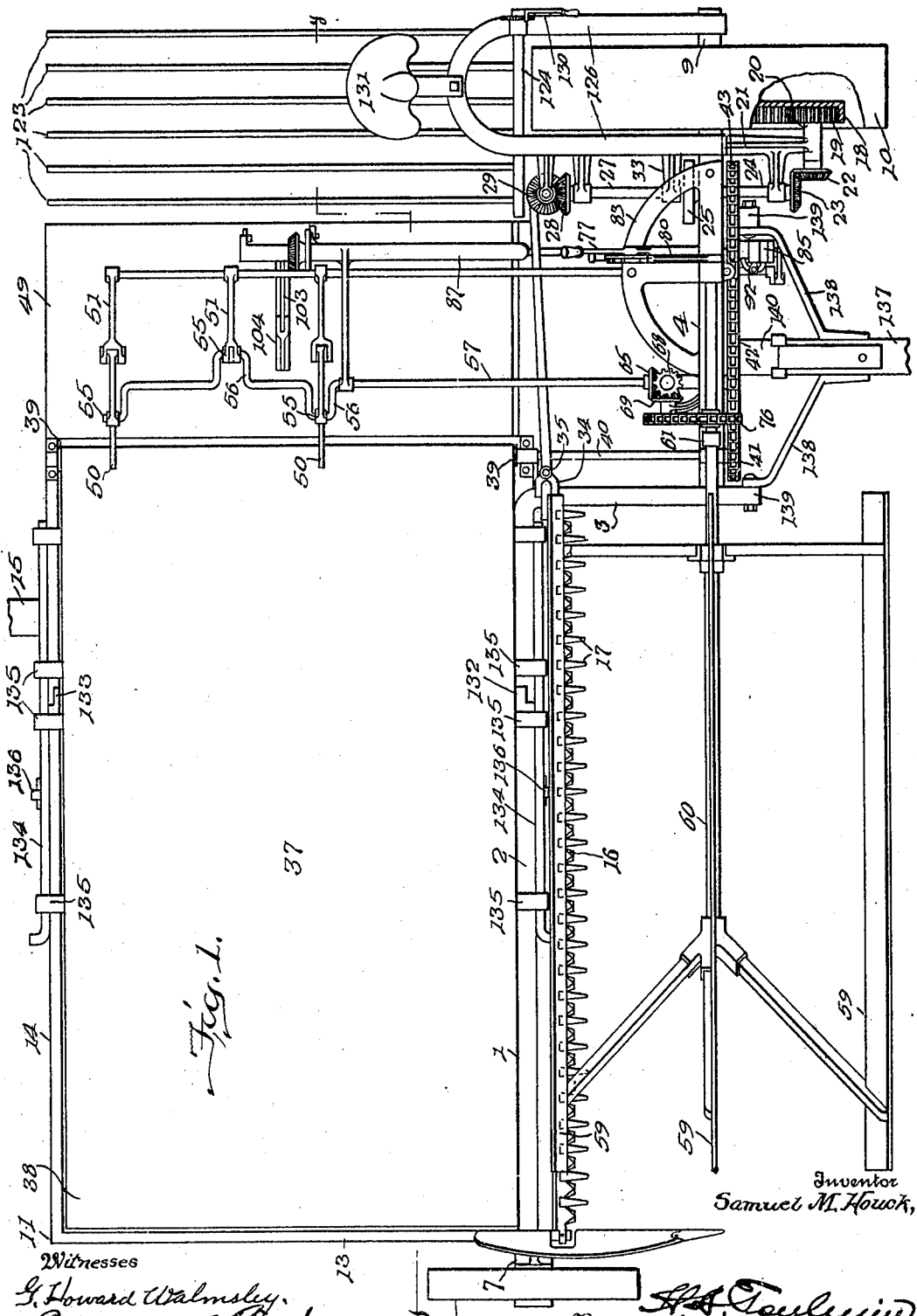

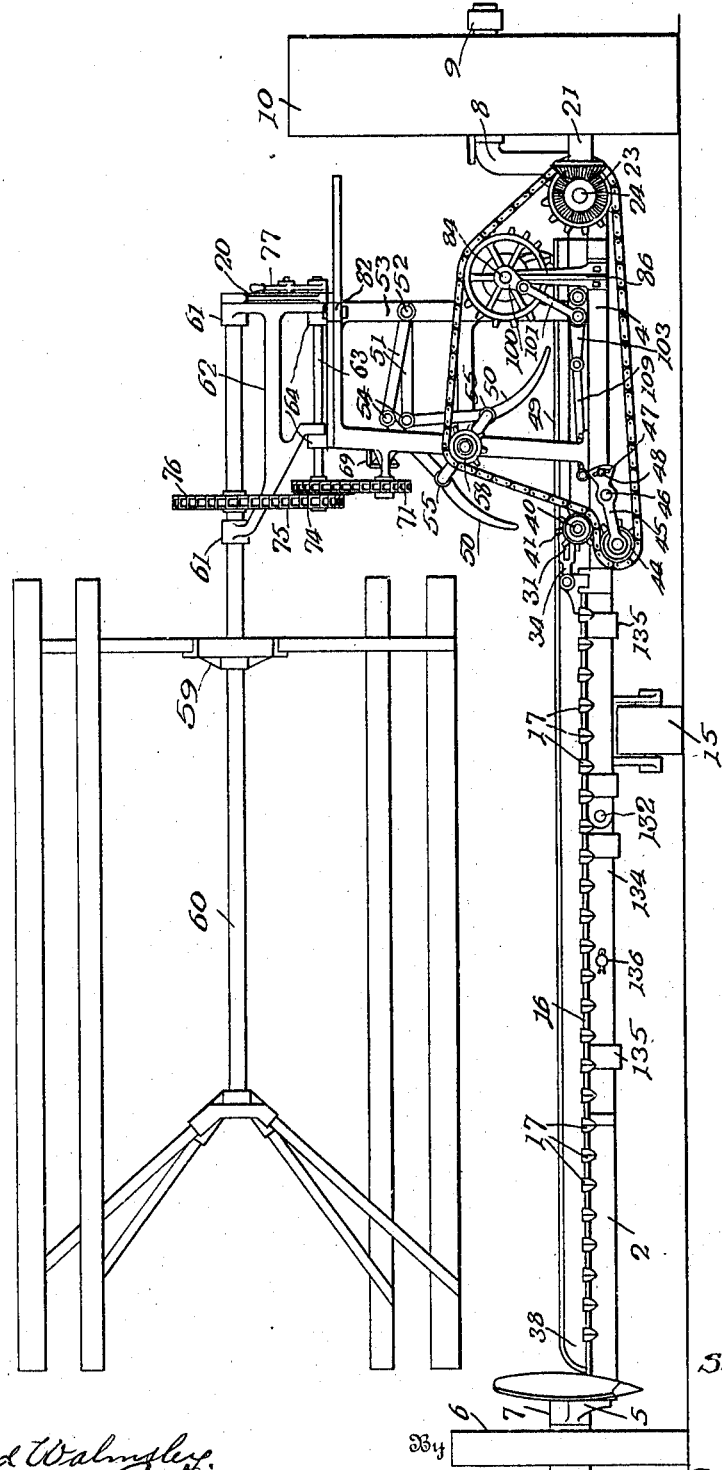

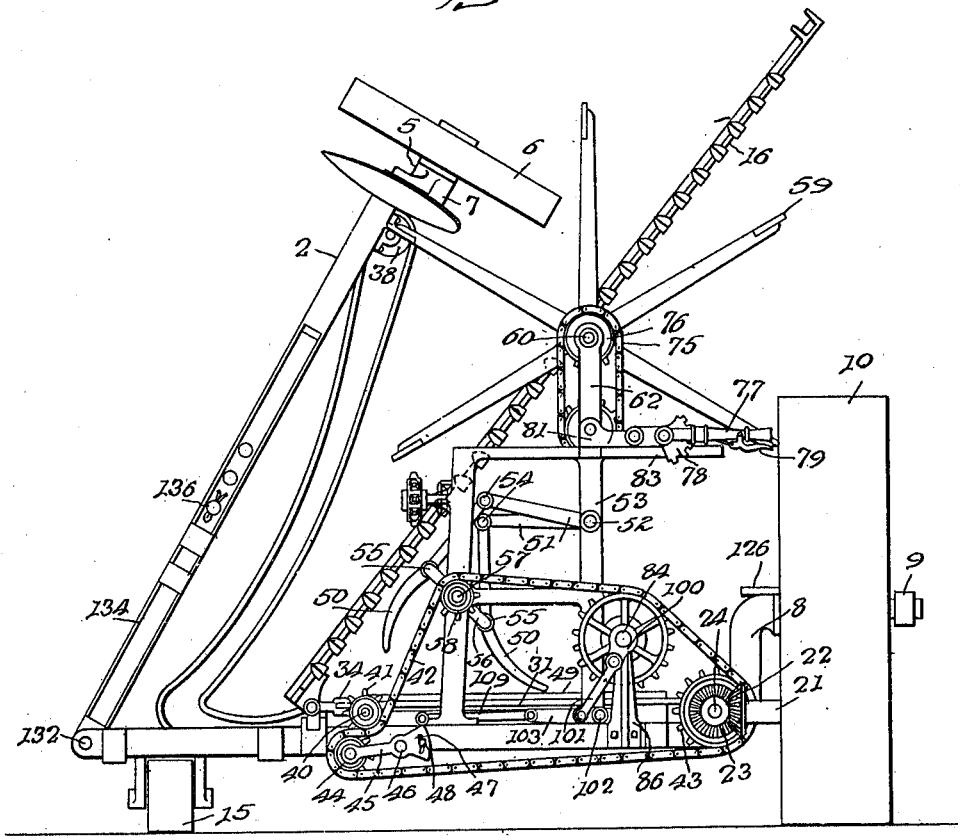
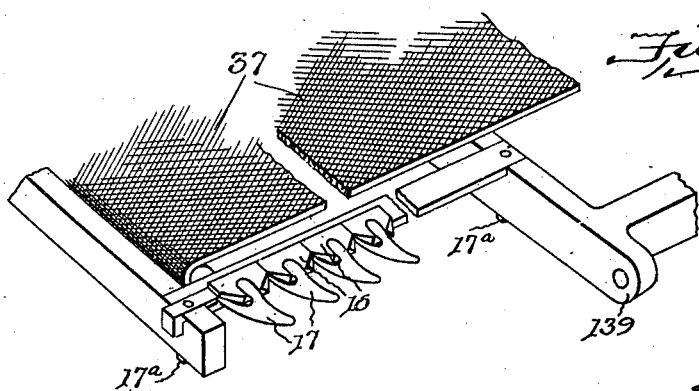

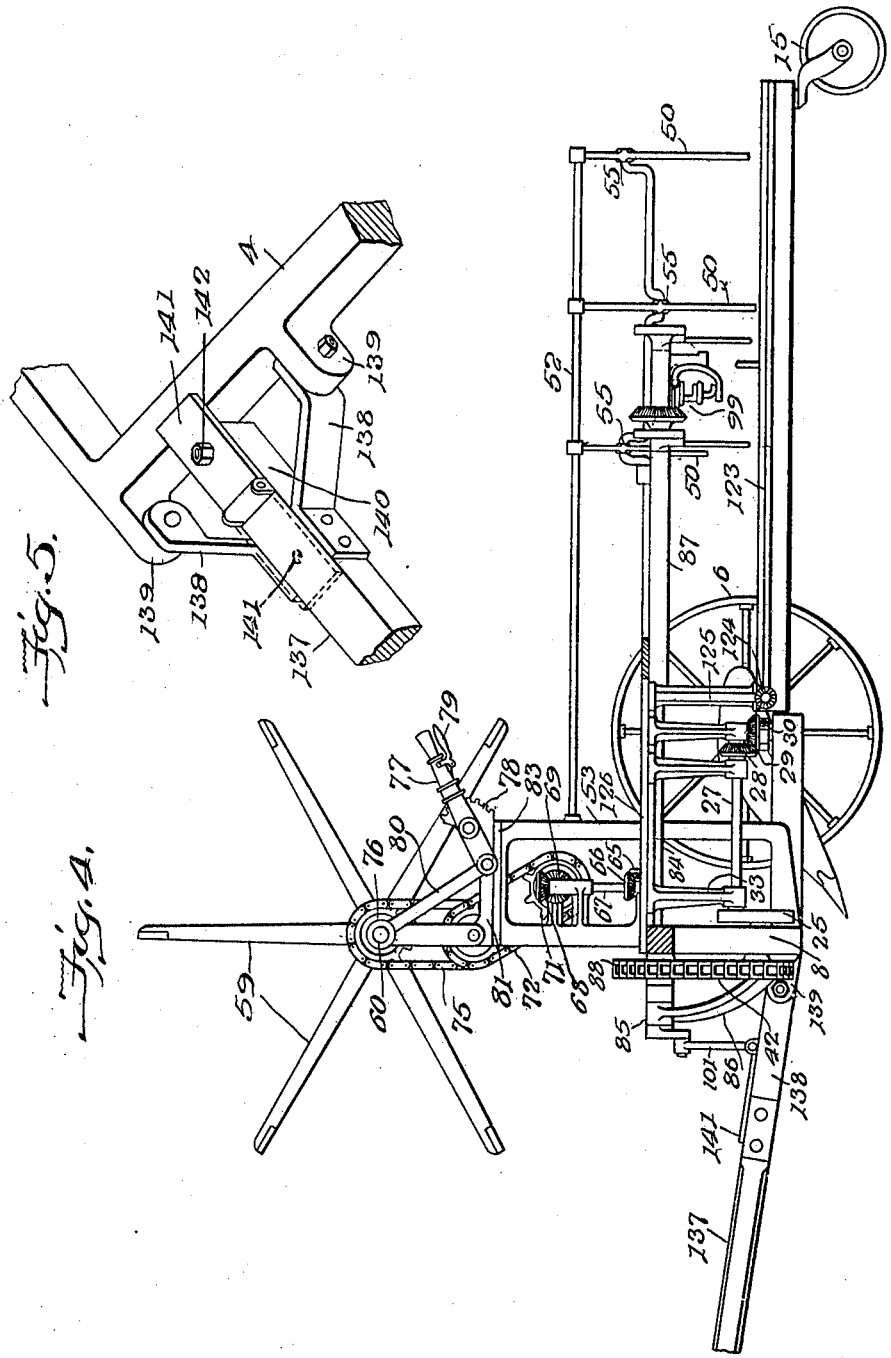

UNITED STATES PATENT OFFICE.

SAMUEL M. HOUCK, OF SPRINGFIELD, OHIO.

HARVESTER.

953,145.  Specification of Letters Patent.  Patented Mar. 29, 1910.

Application filed July 25, 1907, Serial No. 385,485. Renewed August 17, 1909. Serial No. 513,349.

*To all whom it may concern:*

Be it known that I, SAMUEL M. HOUCK, a citizen of the United States, residing at Springfield, in the county of Clark and State of Ohio, have invented certain new and useful Improvements in Harvesters, of which the following is a specification, reference being had therein to the accompanying drawings.

This invention relates to harvesters, and, while the specific form of construction shown is devised more particularly for use as a harvester for small grain, such as wheat, certain features of the invention are applicable to harvesters generally, such as corn harvesters.

The general purpose of the construction is to provide a harvester of such a character as to do away with the necessity of elevating the grain over the main wheel in carrying it from the rear of the cutter to the binding mechanism, and to this end the invention consists in certain features of construction devised more particularly with this end in view, which features will be hereinafter more fully described and then specifically pointed out in the claims.

In the accompanying drawings, Figure 1 is a plan view of a harvester embodying my invention in one form; Fig. 2 is a front elevation of the same, with the tongue removed; Fig. 3 is a view similar to Fig. 2, but showing the machine folded up for transportation; Fig. 4 is a side elevation, partly in vertical section, viewed from the stubble side of the machine; Fig. 5 is a detail perspective view, illustrating the connection between the tongue and axle; Fig. 6 is an enlarged detail view of a portion of Fig. 2; Fig. 7 is a detail perspective view of a portion of Fig. 6; Fig. 8 is a detail sectional view, taken on the line $x$ $x$ of Fig. 7, and looking in the direction of the arrows; Fig. 9 is a vertical sectional view, taken on the line $y$ $y$ of Fig. 1, and looking in the direction of the arrows; Fig. 10 is an enlarged detail view in vertical section, taken in front of the needle and compressor and looking rearward; Fig. 11 is a detail front elevation of the cutter operating mechanism; Fig. 12 is a plan view of the same; Fig. 13 is a sectional view, taken on the line $z$ $z$ of Fig. 11, and looking in the direction of the arrows; Fig. 14 is an elevation of a portion of the machine, showing the sheaf or bundle carrier and dropper; and Fig. 15 is a detail perspective view, illustrating the mode of attaching the finger bar.

In carrying out my invention, I propose to support the machine, when in its normal or operative position, upon three wheels, to wit, a grain wheel, a main wheel and a caster wheel, the two former being located at opposite ends of an axle lying immediately back of the cutter, and with that end thereof which carries the main wheel located forward of the body portion of the axle, so that the grain, as it travels laterally along the rear of the cutter, can pass to the rear of the main wheel and need not be carried upward over the same. The third or caster wheel is a trailing wheel located at the rear of the main frame.

The binding mechanism is preferably located between the main wheel and cutter, and a suitable conveyer, running transversely of the machine in the usual manner in the rear of the cutter, serves to convey the grain to the binding mechanism.

Referring to the accompanying drawings, which illustrate one embodiment of my invention, 1 indicates the axle as a whole. It comprises a main transverse portion 2, which extends across the machine at the rear of the cutter, a forward extending portion 3, and a second transverse portion 4, parallel with but in advance of the transverse portion 2. The grain end of the axle is extended up somewhat, as indicated at 5, to bring it to a sufficient height to receive the grain wheel 6, which is mounted on a horizontal extension 7 of the axle. At its stubble end the axle is similarly bent up, as indicated at 8, but to a greater height, and then extended horizontally outward, as indicated at 9, to receive the main wheel 10.

11 indicates the frame as a whole, extending rearward from the axle and comprising side members 13 and a transverse rear member 14, to which latter the third or caster wheel 15 is swiveled at about midway of the width of the machine.

The cutter bar is indicated at 16, and is of the usual reciprocating type, being adapted to reciprocate in a finger bar 17, located in front of the main transverse portion 2 of the axle, and detachably secured to the frame by bolts 17$^a$. This cutter bar is preferably driven by the following mechanism. 18 indicates an internal gear, secured to the main wheel 10, with which gear meshes a pinion 19 on a shaft 20, secured in a suitable bearing on a bracket 21, extending forward from the axle. The shaft 20 is provided at its other end with a bevel pinion 22, which meshes with a similar pinion 23 on a longitudinal shaft 24. This shaft is provided at its rear end with an internal gear 25, with which meshes a pinion 26 on a shaft 27, having at its rear end a bevel pinion 28, which meshes with a horizontal bevel pinion 29, which carries the eccentric crank pin 30 of the pitman 31, by means of which the cutter bar is actuated. The bevel gear 29 is mounted on a short vertical shaft 32, which, as well as the shaft 27, is carried in suitable bearings, attached to or formed on brackets 33. It will be observed that the shaft 32 is vertical, and the bevel pinion or wheel 29, which is the crank wheel of the cutter, rotates in a horizontal plane, with the crank pin on its under side. The pitman 31 is preferably connected with the cutter bar by a universal joint, comprising a coupling 34, connected with the pitman by a vertical pivot 35 and with the cutter bar by a horizontal pivot 36.

Back of the cutter bar and axle there is located in the main frame 11 a conveyer 37, preferably a canvas belt of the usual description, passing around an idle roller 38 at the end thereof adjacent to the grain wheel, and extending thence to a point slightly beyond the forward bend of the axle, where it passes around a roller 39, mounted on a longitudinal shaft 40, supported in suitable bearings and provided at its forward end with a sprocket wheel 41. This shaft is driven by a sprocket chain 42, which passes under the sprocket 41 and around a sprocket wheel 43 on the shaft 24. This sprocket chain drives the binding mechanism and reel, passing around certain other sprocket wheels, hereinafter referred to, for this purpose, and also around an idle sprocket wheel 44, lying below the sprocket wheel 41 and serving as a chain tightener, being mounted for this purpose on an arm 45, pivoted at 46 on the axle and adjustable by means of a slot 47 and clamping bolt 48 in the usual manner.

The binding deck, which is indicated at 49, is horizontal and in substantially the same plane as the top of the conveyer 37, said binding deck preferably lying between the cutter and main wheel and rearward of the same. The packers, which are indicated at 50, are arranged above said deck, being supported by links 51, pivotally mounted on a rod or shaft 52, extending rearward from a frame 53, located at the front of the machine, between the main wheel and the forward extension 3 of the axle. The packers have their upper ends pivoted at 54 to the free ends of the links 51, and have at intermediate points bearings 55 on cranks 56 on the packer shaft 57. Said packer shaft is provided with a sprocket wheel 58, over which the sprocket chain 42 runs, thus imparting motion to the packer shaft and packer.

The reel is indicated at 59 and is mounted on a reel shaft 60, which shaft is in turn mounted in bearings 61 in a reel supporting yoke 62, pivotally mounted on a shaft 63, which is itself mounted in bearings 64, supported in the manner hereinafter described on top of the frame 53. The reel is driven by means of a bevel gear 65 on the packer shaft 57, which gear meshes with a bevel gear 66 on a vertical shaft 67, provided at its upper end with a bevel gear 68, which meshes with a similar gear 69 on a short horizontal shaft 70, carrying a sprocket wheel 71. A sprocket chain 72 passes around this sprocket wheel and a similar sprocket wheel 73 on the shaft 63, which latter shaft is provided with a sprocket wheel 74, around which passes a sprocket chain 75, also passing around a sprocket wheel 76 on the shaft 60. This reel may be tilted in the usual manner by means of a lever 77, having the usual locking segment 78 and latch 79, and provided with a link 80, connected with the upper part of the yoke 62. All of these parts, to wit, the yoke and controlling lever, as well as the shaft 63, are mounted on a base or turn table 81, pivoted at 82 on top of the frame 53, which is provided with a curved track or way 83, upon which the turn table or base 81 may travel, the purpose of this construction being to permit the reel to be swung from its operative position, shown in Figs. 1 and 2, into a position substantially in the line of draft, as indicated in Fig. 3. The purpose of this construction, which is deemed preferable but not essential, will be hereinafter referred to.

Referring again to the binding mechanism, it comprises a shaft 84, which I shall term the main shaft, since from it the motion of all parts of the binding mechanism except the packers is derived. This shaft is mounted at its front end in a bearing 85, supported by a bracket 86 arising from the part 4 of the axle, the rear end of said shaft extending through an arm 87, by means of which it is supported. Near the forward end of this shaft there is mounted, so as to rotate freely thereon, a sprocket wheel 88, around which the drive chain 42 passes, so that a continuous rotary motion is imparted to said wheel. The hub of the wheel is provided with a notch or recess 89, and the bearing 85 is provided with a corresponding notch or recess 90. Between said wheel and bearing there is secured on the shaft 84 a collar 91, and on this collar there is pivoted a lever 92, having one arm, 93, extending over the hub of the wheel 88 and provided with a projection 94 to engage with the recess 89 thereof. The other arm of said lever, indicated at 95, extends over the fixed bearing 85 and has a projection 96, which is adapted to normally engage with the recess 90 thereof. The projections 94 and 96 may be in the form of rollers, if desired, to reduce friction. A spring 97, secured to the collar 91, bears upon the lever 92 in such a way as to cause the arm 95 thereof to normally engage the bearing 85. Secured upon the shaft 84 are two or more arms 98, which serve not only as trip arms for the purpose of starting the action of the binding mechanism, but also as stop arms to arrest the incoming grain to form the bundle, and as discharge arms or ejectors for removing the bundle from the binding deck. To enable them to accomplish this first function, the projection 96 and notch 90 are so constructed that, as the grain accumulates against the arms 98 under the influence of the packers, the pressure against the arms 98 having a tendency to impart a rotary motion to the shaft 84, thereby tending to draw the projection 96 clear of the aperture 90, when the notch 89 comes opposite the projection 94, said projection will enter said notch, owing to the rotary tendency of the shaft 84 and to the pressure of the grain overcoming the action of the spring 97. As soon as the arm 93 thus engages the hub of the wheel 88, it is held in such engagement during one complete revolution of the shaft 84, by reason of the projection 96 traveling on the outer surface of the bearing 85, and this engagement will continue until the arm 95 again comes opposite the notch 90 in the bearing 85, when its end will drop into said notch, and the shaft will be disconnected from the wheel 88, which will continue to revolve as before, the shaft remaining stationary until the trip mechanism again operates. It will be observed that each arm 98 comprises two parallel fingers, 98$^a$ and 98$^b$, being in effect a single arm with the intermediate metal cut away or omitted, the forward edge acting as a stop and trip contact surface, while the rear edge operates to discharge the bundle.

The shaft 84 is connected near its rear end with the usual knotting mechanism 99, which may be of any approved construction. The needle and its associated mechanism are also driven from the shaft 84, which is provided for this purpose on its forward end with a crank arm 100, to which is connected a pitman 101, by means of which a rocking motion is communicated in the ordinary manner to the needle shaft 102. This shaft extends under the binding deck 49 and is provided at a suitable point with the needle 103, which is adapted to be projected through a slot 104 in the binding deck. The binding deck being horizontal and near the surface of the soil, the needle is of peculiar shape, in order not to project downward to such an extent when in its normal position as to render it liable to injury. For this reason it consists of a radial shank portion 105 and a curved tip 106, of comparatively short length. There is provided below the binding deck a flooring or second deck 107, forming a space 108, within which the needle lies protected when not at work. In order to form a cut-off and prevent the grain from accumulating back of the straight shank of the needle in such a way as to prevent its return after its operative stroke, I provide a cut-off rod 109, pivoted at one end to the end of the straight portion or shank of the needle, as indicated at 110, its other end being provided with an anti-friction roller 111, or being otherwise suitably adapted to travel along or slide upon the platform or deck 107, or other suitable guiding means. The operation of this pivoted cut-off bar will readily be understood from an examination of Fig. 10, in which the positions of the needle and said bar throughout the range of movement of the parts are indicated in full and dotted lines.

The compressor, which is indicated at 112, has its hub 113 mounted on a bearing stud 114 and is provided with a projection 115, to which is connected a spring 116, which acts to draw the compressor toward the bundle in the usual manner. The needle is provided with a hub 117, having thereon projections 118 and 119, which are adapted to alternately engage with a projection 120 from the compressor hub. The needle hub has a cut-away portion 121 adjacent to the projection 118 and a second cut-away portion 121$^a$ adjacent to the projection 119, there being a cylindric portion 122 of said hub between the cut-away portions 121 and 121$^a$. When the needle is in its normal position, as indicated in full lines in Fig. 10, the compressor is held in the upright position shown in full lines, and while the needle moves upward, the compressor is held in said position by means of the spring 116 and, consequently, by the cylindric portion 122. As the needle completes its upward movement, the projection 119 comes in contact with the projection 120 and causes the compressor to move forward toward the needle, thus compressing the bundle ready for tying. After the needle recedes, the projection 120 is free to move through the cut-away space or portion 121 of the needle hub, so that, when the discharge arms strike the bundle, the compressor is free to yield downward into the position shown in dotted lines, to permit the discharge of the bundle.

Adjacent to the binding platform is the bundle carrier 123, which consists of a plurality of longitudinally extending rods, secured at their front ends to a shaft 124, mounted in brackets 125, depending from the seat frame 126, which latter is secured to the axle, being supported by the horizontal portion 9 thereof, on which the main wheel 10 has its bearing. The shaft 124 is provided with a crank arm 127, which is connected by a link 128 to an arm 129 on a lever 130, mounted on the seat frame 126 in advance of the driver's seat 131 and provided with the usual locking segment and latch for securing it in any position to which it may be adjusted. By this means the bundle or bundles as discharged from the binding deck may be readily deposited upon the ground.

In the preferred form of my machine, I construct it in such a manner that it may be folded up so as to decrease its total width to permit it to be more readily transported and taken through comparatively narrow openings, such as gates, or along the highway. In this preferred form, the axle is provided at a suitable point along the main portion 2 thereof with a hinged joint 132, the frame 11 being similarly joined at 133. Any suitable means for holding the hinged portions of the axle and frame in line when in operative position may be employed, as, for instance, a locking bar 134, sliding through keepers 135 and provided with a suitable locking device 136. It will be seen that, when the locking bars are withdrawn into the position shown in Fig. 3, that end of the machine nearest the grain may be folded up into the position shown in Fig. 3, the conveyer offering no obstacles to such folding, and the cutter and cutter bar being foldable around the horizontal pivot connecting the cutter with its pitman. As a preliminary to this folding up of the grain side of the machine, the reel will be turned into the line of draft in the manner indicated in Fig. 3 through the mechanism already described as being provided for that purpose.

The tongue, which is indicated at 137, is pivoted to the axle, being shown as provided with hounds 138 for that purpose, which are pivoted to lugs 139 on the part 4 of the axle. Thus, when the machine is in use it is supported on the three ground wheels, and no portion of the weight comes upon the horses. When, however, the machine is folded up in the manner just described, it becomes necessary to provide a third point of support for the machine, and this is accomplished by rendering the connection between the tongue and machine proper rigid. To this end, the tongue has an extension 140 rearward of the point where the hounds are connected to it, and there is pivoted on the top of the tongue a plate 141, which normally extends forward of its pivot in the manner shown in dotted lines in Fig. 5. When it is desired to lock the tongue rigidly to the machine, said plate is turned on its pivot so as to extend rearward from the tongue over the top of the part 4 of the axle, and is secured in that position by a bolt 142, passing through an aperture 142' in the plate and through the tongue. This will prevent any downward motion of the forward part of the frame, which will then be supported on the main wheel 10, caster wheel 15 and on the shoulders of the horses.

It will be observed that by supporting the machine on three supporting wheels, one of which is a caster wheel located in the rear of and between the two other wheels, I am enabled to employ a loose or pivoted tongue, thus taking the weight of the machine off of the horses, and at the same time giving it greater firmness or steadiness when in use. Moreover, by the arrangement described, the grain side of the machine may be folded up and the connection between the tongue and the body of the machine rendered rigid so as to narrow the width of the machine and support it upon the main and caster wheels and the horses' necks. The construction of the axle hereinbefore described brings the main wheel forward of the line of travel of the grain when this latter is carried directly across the machine in a horizontal plane from the rear of the cutter, thus doing away with the employment of an elevator and avoiding the clogging of the butts of the grain at the heel of the knife or entrance of the elevator. The arrangement of the tongue is, moreover, nearer the center of draft than in the ordinary harvester supported on two wheels only.

While I have described my invention as embodied in a grain binding harvester, it is obvious that some of the features are applicable to harvesters generally; for instance, corn harvesters. Certain other features are also applicable to mowing machines or the like. Moreover, various modifications may be made without departing from the principle of my invention. For instance, although I have illustrated my invention as applied to a machine capable of being folded up for transportation, it is not limited to a machine of this type, and the folding features may be omitted. Again, although I prefer to locate the binding mechanism between the main wheel and cutter, such a location is not essential, since the binding mechanism might be located on the other or outer side of the main wheel and yet be in line with the conveyer and on a level therewith, so as to avoid the necessity of elevating the grain over the main wheel. I therefore do not wish to be understood as limiting myself to the precise details of construction hereinbefore described and shown in the accompanying drawings.

Having thus fully described my invention, what I claim as new and desire to secure by Letters Patent, is:—

1. In a harvester, a cutter; an axle comprising a main portion lying in the rear of the cutter and having a grain wheel at its outer end, a second portion lying parallel with the main portion and forward of the same and having a main or driving wheel at its outer end, and a longitudinal portion connecting the inner ends of the two transverse portions.

2. In a harvester, a cutter, an axle comprising a main portion lying in the rear of the cutter and having a grain wheel at its outer end, a frame extending rearward from said main portion and provided with a horizontal laterally moving conveyer, a caster wheel supporting said frame at the rear, said axle having a second portion lying parallel with and forward of the main portion and provided with a main or driving wheel at its outer end located in front of the line of travel of the conveyer.

3. In a harvester, an axle having parallel connected portions, one forward of the other, the forward portion being provided with a main or driving wheel, and the rear portion with a grain wheel, a cutter in advance of the rear portion, a laterally moving horizontal conveyer in the rear of the rear portion, a frame for said conveyer connected to the rear of said rear portion and provided with a caster wheel at its rear, the main wheel lying in front of the line of travel of the conveyer, and a binding deck and binding mechanism located between a line, extending in the direction of travel of the machine and through the main wheel, on one side and the conveyer and cutter on the other.

4. In a harvester, an axle having parallel connected portions, one forward of the other, the forward portion being provided with a main or driving wheel, and the rear portion with a grain wheel, a cutter in advance of the rear portion, a laterally moving horizontal conveyer in the rear of the rear portion, a frame for said conveyer connected to the rear of said rear portion and provided with a caster wheel at its rear, the main wheel lying in front of the line of travel of the conveyer, and a binding deck and binding mechanism located between a line, extending in the direction of travel of the machine and through the main wheel, on one side and the conveyer and cutter on the other, the binding deck being in the same horizontal plane as the conveyer.

5. In a harvester, an axle having parallel connected portions, one forward of the other, the forward portion being provided with a main or driving wheel and the rear portion with a grain wheel, a cutter in advance of the rear portion, a frame secured to the rear of said rear portion and provided with a laterally moving horizontal conveyer and with a supporting caster wheel at its rear, the main wheel lying in front of the line of travel of the conveyer, a binding deck and binding mechanism located between a line, extending in the direction of travel of the machine and through the main wheel, on one side and the conveyer and cutter on the other, the deck being horizontal and forming an extension of the conveyer, in the plane of which it lies, and a bundle carrier and dropper located in the rear of the main wheel adjacent to and normally in the plane of the binding deck.

6. In a harvester, an axle having parallel connected portions, one forward of the other, the forward portion being provided with a main or driving wheel and the rear portion with a grain wheel, a cutter in advance of the rear portion, a frame secured to the rear of said rear portion and provided with a laterally moving horizontal conveyer and with a supporting caster wheel at its rear, the main wheel lying in front of the line of travel of the conveyer, a binding deck and binding mechanism located between a line, extending in the direction of travel of the machine and through the main wheel, on one side and the conveyer and cutter on the other, the deck being horizontal and forming an extension of the conveyer, in the plane of which it lies, a bundle carrier and dropper located in the rear of the main wheel adjacent to and normally in the plane of the binding deck, and a yoke-shaped seat frame embracing the main wheel, secured to the forward part of the axle, provided with a seat and supporting the bundle carrier and its operating mechanism.

7. A harvester having three supporting wheels, a main wheel at one side, a grain wheel at the other side, an axle for said wheels, and an intermediate caster wheel at the rear, the axle and frame of said harvester being jointed between the caster wheel and grain wheel to permit the grain side of the machine to be folded over onto the remainder of the machine, in combination with a draft tongue having a normally pivotal connection with the main or non-folding portion of the machine, and means for rendering said connection rigid against downward movement of the connected ends of the parts when the machine is folded.

8. A harvester having three supporting wheels, a main wheel at one side, a grain wheel at the other side, an axle for said wheels, and an intermediate caster wheel at the rear, the axle and frame of said harvester being jointed between the caster wheel and grain wheel to permit the grain side of the machine to be folded over onto the remainder of the machine, in combination with a draft tongue having a normally pivotal connection with the main or non-folding portion of the machine, and means for rendering said connection rigid against downward movement of the connected ends of the parts when the machine is folded, and a horizontal reel extending normally transversely of the machine and pivotally supported so as to swing into the line of draft above the main or non-folding portion of the machine when the machine is folded.

9. In a harvester, an axle having parallel connected portions, one forward of the other, the forward portion being provided with a main or driving wheel and the rear portion with a grain wheel, a cutter in advance of the rear portion, a laterally moving horizontal conveyer in the rear of the rear portion, a frame for said conveyer, connected to the rear of said rear portion and provided with a caster wheel at its rear, the main wheel lying in front of the line of travel of the conveyer, and a binding deck and binding mechanism located in the line of travel of said conveyer and rearward of the main wheel.

In testimony whereof, I affix my signature in presence of two witnesses.

SAMUEL M. HOUCK.

Witnesses:
A. C. LINK,
EDWARD I. REED.